(12) United States Patent
Ozawa

(10) Patent No.: US 10,484,565 B2
(45) Date of Patent: Nov. 19, 2019

(54) INFORMATION PROCESSING TERMINAL AND RECORDING MEDIUM STORING PROGRAM FOR RECEIVING JOB SETTING OPERATION

(71) Applicant: Konica Minolta, Inc., Tokyo (JP)

(72) Inventor: Tomohiro Ozawa, Tama (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 16/227,990

(22) Filed: Dec. 20, 2018

(65) Prior Publication Data

US 2019/0208073 A1 Jul. 4, 2019

(30) Foreign Application Priority Data

Dec. 28, 2017 (JP) .................. 2017-253169

(51) Int. Cl.
| | |
|---|---|
| G06F 15/00 | (2006.01) |
| G06K 15/00 | (2006.01) |
| G06K 1/00 | (2006.01) |
| H04N 1/00 | (2006.01) |
| H04N 1/44 | (2006.01) |
| G06F 3/12 | (2006.01) |

(52) U.S. Cl.
CPC ..... H04N 1/00973 (2013.01); H04N 1/00244 (2013.01); H04N 1/00482 (2013.01); H04N 1/4433 (2013.01); *H04N 2201/0094* (2013.01)

(58) Field of Classification Search
CPC ........... H04N 1/00973; H04N 1/00244; H04N 1/00482; H04N 1/4433; H04N 2201/0094
USPC ............................... 358/1.14, 1.13, 1.15, 1.1
See application file for complete search history.

(56) References Cited

U.S. PATENT DOCUMENTS

| | | | | |
|---|---|---|---|---|
| 2012/0307306 A1* | 12/2012 | Kishida | .............. | H04N 1/00973 358/1.15 |
| 2014/0029035 A1* | 1/2014 | Maruyama | ............ | G06F 3/1297 358/1.13 |
| 2014/0204416 A1* | 7/2014 | Kuroyanagi | ....... | H04N 1/00408 358/1.15 |

FOREIGN PATENT DOCUMENTS

| | | |
|---|---|---|
| JP | 2013-250940 A | 12/2013 |
| JP | 2014-060671 A | 4/2014 |

* cited by examiner

*Primary Examiner* — Douglas Q Tran
(74) *Attorney, Agent, or Firm* — Osha Liang LLP

(57) ABSTRACT

An information processing terminal includes a hardware processor that displays an operation screen of an image processing apparatus in accordance with Web UI display data received from a server, returns information about an operation received from a user through the operation screen to the server, receives a job setting operation, determines whether job setting information created by the server recognizing details of the operation from the information about the operation is to be transmitted from the server to the image processing apparatus by a first communication method in accordance with a predetermined determination condition, the first communication method involving a path via a local network to which the image processing apparatus belongs, acquires the job setting information when the hardware processor determines that the first communication method is not to be used, and transmits the acquired job setting information to the image processing apparatus, using a second communication method.

12 Claims, 8 Drawing Sheets

INFORMATION PROCESSING TERMINAL AND RECORDING MEDIUM STORING PROGRAM FOR RECEIVING JOB SETTING OPERATION

CROSS-REFERENCE TO RELATED APPLICATION

The entire disclosure of Japanese patent Application No. 2017-253169, filed on Dec. 28, 2017, is incorporated herein by reference in its entirety.

BACKGROUND

Technical Field

The present invention relates to an information processing terminal that receives a job setting operation by using a Web UI, and a recording medium storing a program therefor.

Description of the Related Art

A function called Web User Interface (UI) is being used these days. This Web UI function is to transmit HTML display data of an operation screen of an apparatus such as a multifunction peripheral having copy, print, and scan functions and the like from a cloud server to an information processing terminal such as a tablet, display the display data of the operation screen on a browser on the information processing terminal that has received the display data, return information about an operation received from the user from the information processing terminal to the cloud server, and thus accept a job setting operation. The information processing terminal simply returns location information about each operation received from the user to the cloud server, and the cloud server collates this position information in accordance with the items shown in the operation screen being displayed, and recognizes the details of the operation, to create and store job setting information processing terminal. The created and stored job setting information and a job start instruction are transmitted from the cloud server, via a network, to the multifunction peripheral or the like that is to execute the job.

FIG. 7 shows an example of data to be transmitted and received when a job is set/input with a Web UI. In the case of a Web UI, information about an operation received by the browser of a user terminal (or information or the like indicating the location where the operation has been received) is transmitted from the user terminal to a cloud server (P1). The cloud server recognizes the details of the operation from the information, and creates job setting information (P2). The could server then transmits the job setting information to a multifunction peripheral (P3).

FIG. 8 shows a connection state in a case where an information processing terminal is connected to a local network of a business client to use a multifunction peripheral connected to the local network of the business client at the business client's office, and a job is to be set/input through a Web UI function. Specifically, an information processing terminal (a user terminal) of a user is connected to the local network of a business client and transmits, via the local network, information about an operation relating to job setting and information about an operation relating to a job start instruction to a cloud server. The cloud server transmits created job setting information and a job start instruction to a multifunction peripheral (MFP) connected to the local network via the local network of the business client.

As described above, in a case where a Web UI is used at a business client's office or the like, information passes through the local network of the business client. In a case where the security level of the network environment at the business client's office is low, however, the security level required by the user's company cannot be guaranteed. Specifically, in a case where the encryption scheme adopted in the network is WEP or the SSL/TLS version in multifunction peripherals is an old version, the required security level cannot be guaranteed even if the network can be used.

JP 2014-60671 A discloses a technique for switching communication unit to reduce the load on the communication network. JP 2013-250940 A discloses a technique for calculating a communication time from a data size or the like and switching the communication path to one with the shorter standby time. However, neither of these techniques treats the above matter. It should be noted that the reason that the local network of a business client cannot be used is not necessarily a low security level.

SUMMARY

One or more embodiments of the present invention provide an information processing terminal and a recording medium storing a program that can transmit job setting information to an image processing apparatus and cause the image processing apparatus to execute a job, even in a case where the local network to which the image processing apparatus as the job input destination is connected cannot be used for some reason such as a low security level when a Web UI is used.

According to one or more embodiments of the present invention, an information processing terminal comprises a hardware processor that displays an operation screen of an image processing apparatus in accordance with Web UI display data received from a server, returns information about an operation received from a user through the operation screen to the server, receives a job setting operation, determines whether job setting information created by the server recognizing details of the operation from the information about the operation is to be transmitted from the server to the image processing apparatus by a first communication method in accordance with a predetermined determination condition, the first communication method involving a path via a local network to which the image processing apparatus belongs, acquires the job setting information from the server when the hardware processor determines that the first communication method is not to be used, and transmits the job setting information acquired by the hardware processor to the image processing apparatus, using a second communication method different from the first communication method.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, embodiments of the present invention will be described with reference to the drawings. However, the scope of the invention is not limited to the disclosed embodiments.

Figure 1:
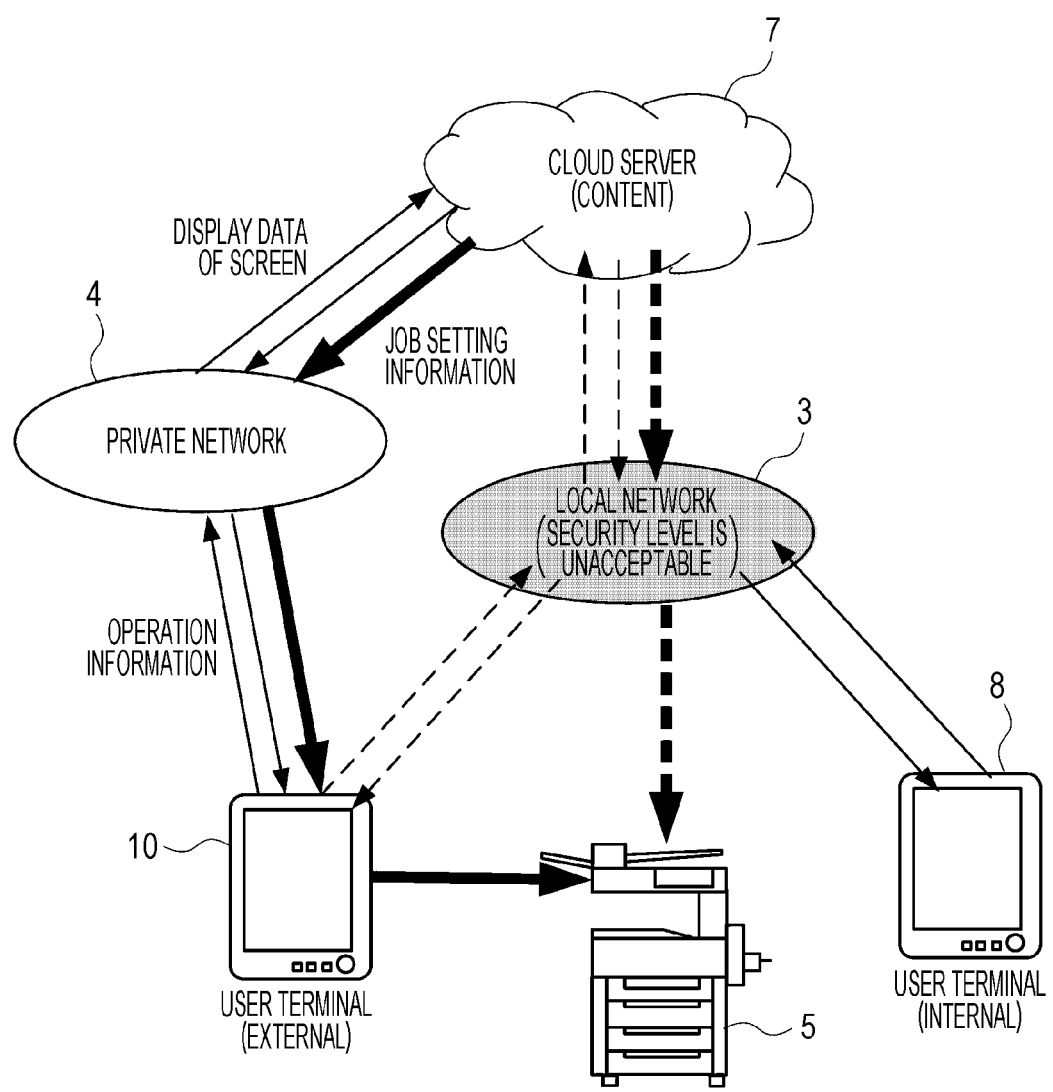
FIG. 1 is a diagram showing an example system configuration according to one or more embodiments in a case where an information processing terminal transmits a job to a multifunction peripheral installed at a business client's office, using a Web UI of a cloud server.

FIG. 1 shows an example system configuration in a case where an information processing terminal according to one or more embodiments of the present invention transmits a job to a multifunction peripheral 5 installed at a business client's office, using a Web UI of a cloud server 7.

The multifunction peripheral 5, which is an image processing apparatus, is connected to an internal local network 3 of the business client, the local network 3 is connected to a wide area network (not shown), and the cloud server 7 is connected to the wide area network.

An internal user terminal 8 that is an information processing terminal of an internal user connects to the local network 3, and uses the Web UI function being provided by the cloud server 7. That is, the internal user terminal 8 receives the display data of an operation screen of the multifunction peripheral 5 from the cloud server 7 via the local network 3, and returns information about an operation received from the user to the cloud server 7 via the local network 3. The cloud server 7 creates job setting information in accordance with the received information about the operation, transmits the job setting information to the multifunction peripheral 5 through the local network 3, and causes the multifunction peripheral 5 to execute the job.

When setting/inputting a job through the Web UI, an information processing terminal 10 (a PC, a mobile terminal, or the like) of one or more embodiments of the present invention, which is a terminal device of an external user, switches connections in accordance with the circumstances concerning the availability of the local network 3 of the business client, such as the security level (WEP, WPA, WPA2, or the like) of the local network 3 of the business client and the security setting (WPA, WPA 2, SSL/TSL version, or the like) in the multifunction peripheral 5, as will be described below. In the description below, the circumstances concerning the availability of the local network 3 of the business client mean the security level (WEP, WPA, WPA2, or the like) of the local network 3 of the business client and the security setting (WPA, WPA 2, SSL/TSL version, or the like) of the multifunction peripheral 5.

(Case 1) A case where the security level of the local network 3 of the business client meets a predetermined standard (or is at the required level), and the security setting (such as the SSL version) of the multifunction peripheral 5 meets a predetermined standard (or is at the required level)

In this case, the operation is the same as that of the internal user terminal 8. That is, the information processing terminal 10 connects to the local network 3, receives the display data of the operation screen of the multifunction peripheral 5 from the cloud server 7 via the local network 3, and returns information about an operation received from the user to the cloud server 7 via the local network 3. The cloud server 7 creates job setting information in accordance with the received information about the operation, transmits the job setting information to the multifunction peripheral 5 through the local network 3, and causes the multifunction peripheral 5 to execute the job.

(Case 2) A case where the security level of the local network 3 of the business client does not meet the predetermined standard (or is not at the required level) (in the case of WEP, for example)

In this case, the security level of the multifunction peripheral 5 does not matter.

In this case, as shown in FIG. 1, the information processing terminal 10 switches the connection from the local network 3 to the private network 4 such as a company or personal WiFi. The information processing terminal 10 then receives the display data of the operation screen of the multifunction peripheral 5 from the cloud server 7 via the private network 4, and returns information about an operation received from the user to the cloud server 7 via the private network 4. The cloud server 7 creates job setting information in accordance with the received information about the operation, and transmits the job setting information to the information processing terminal 10 through the private network 4. The information processing terminal 10 transmits the job setting information received from the cloud server 7 directly to the multifunction peripheral 5 by a communication method not involving a path via the local network 3, such as near-field communication, and causes the multifunction peripheral 5 to execute the job.

Figure 2:
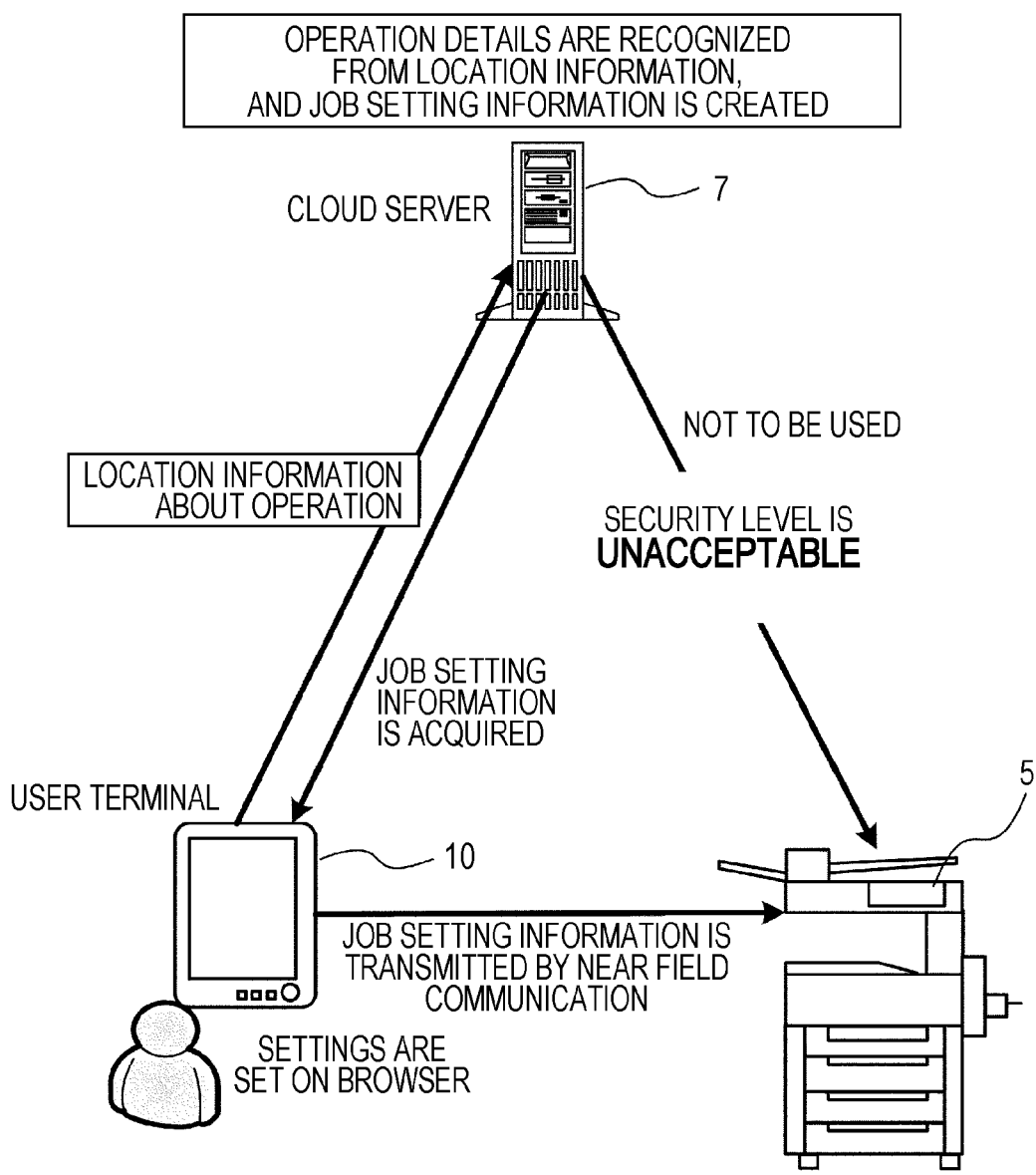
FIG. 2 is a diagram showing a data flow according to one or more embodiments in a case where the security level of the local network of a business client is not at a required level.

FIG. 2 shows a data flow in Case 2. The communication path that connects the cloud server 7 and the multifunction peripheral 5 via the local network 3 cannot be used, because the security level is too low. The cloud server 7 transmits job setting information to the information processing terminal 10 through the private network 4, and the information processing terminal 10 transmits the job setting information to the multifunction peripheral 5 via near-field communication or the like.

It should be noted that the transmission of an operation screen from the cloud server 7 to the information processing terminal 10 and the transmission of information of an operation from the information processing terminal 10 to the cloud server 7 may be executed via the local network 3.

(Case 3) A case where the security level of the local network 3 of the business client meets the predetermined standard (or is at the required level), but the security setting of the multifunction peripheral 5 does not meet the predetermined standard (or is not at the required level)

Figure 3:
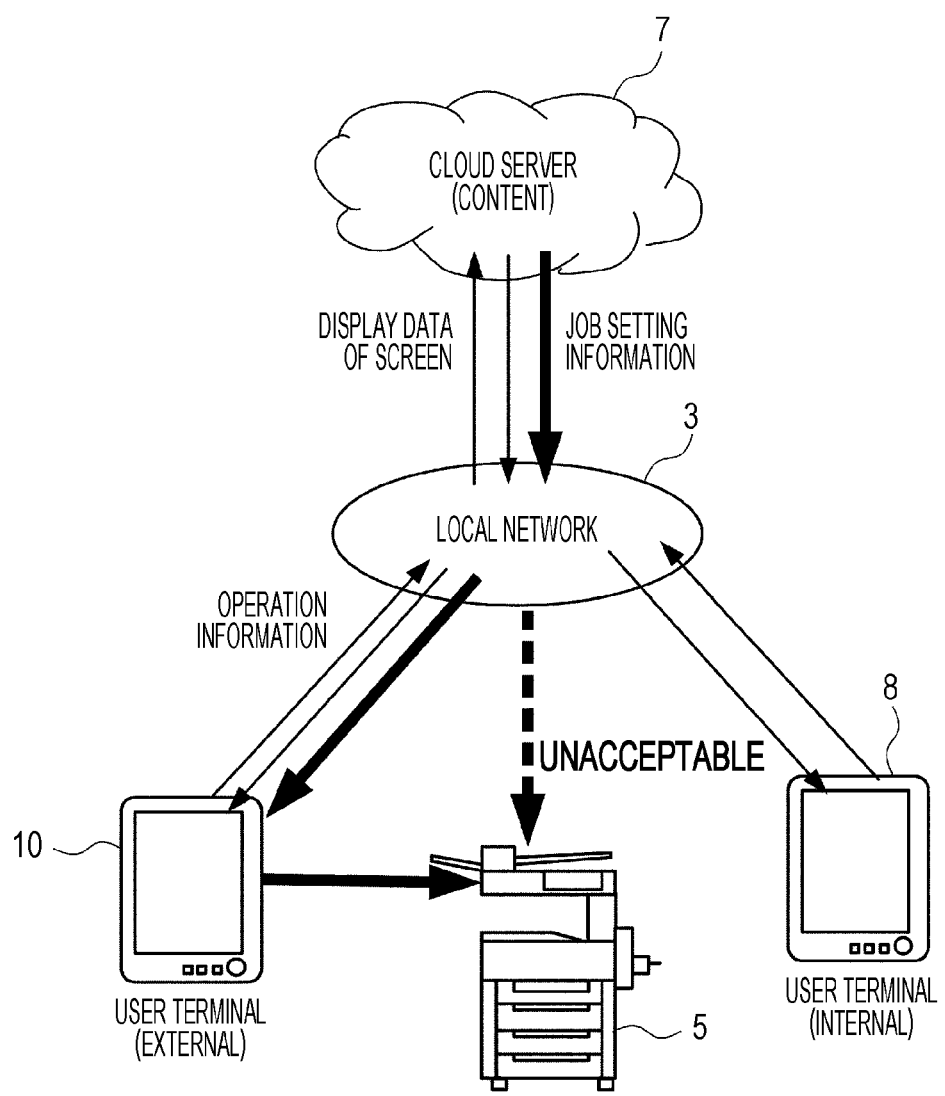
FIG. 3 is a diagram showing a connection and a data flow according to one or more embodiments in a case where the security setting of the multifunction peripheral is not at a required level.

In this case, as shown in FIG. 3, when job setting information is transmitted from the cloud server 7 to the multifunction peripheral 5, a method that involves a path via the local network 3 cannot be used. Therefore, the information processing terminal 10 connects to the local network 3, receives the display data of an operation screen of the multifunction peripheral 5 from the cloud server 7 via the local network 3, and returns information about an operation received from the user to the cloud server 7 via the local network 3. The cloud server 7 creates job setting information in accordance with the received information about the operation. However, the cloud server 7 does not transmit the job setting information to the multifunction peripheral 5 through the local network 3, but transmits the job setting information to the information processing terminal 10 via the local network 3. The information processing terminal 10 transmits the job setting information received from the cloud server 7 directly to the multifunction peripheral 5 by a communication method not involving a path via the local network 3, such as near-field communication, and causes the multifunction peripheral 5 to execute the job.

Figure 4:
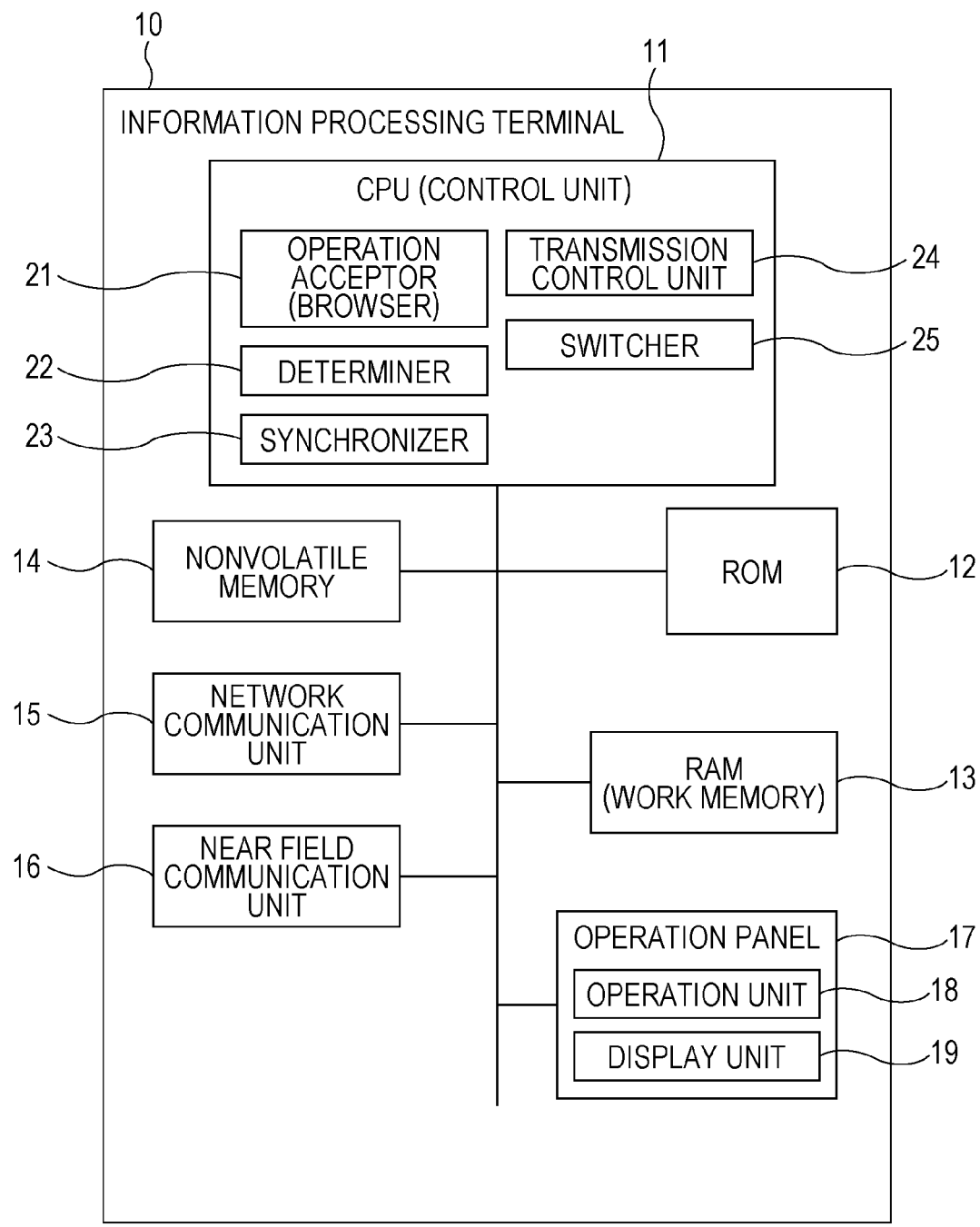
FIG. 4 is a block diagram schematically showing the configuration of an information processing terminal according to one or more embodiments.

FIG. 4 is a block diagram schematically showing the configuration of the information processing terminal 10. The information processing terminal 10 includes a central processing unit (CPU) 11 as a control unit that comprehensively controls operation of the information processing terminal 10. A read only memory (ROM) 12, a random access memory (RAM) 13, a nonvolatile memory 14, a network communication unit 15, a near-field communication unit 16, an operation panel 17, and the like are connected to the CPU 11 via a bus.

The CPU 11 operates according to an operating system (OS) program, and executes middleware, application programs, and the like. Various kinds of programs are stored in the ROM 12, and the CPU 11 executes various kinds of processes in accordance with these programs, to achieve the respective functions of the information processing terminal 10.

The RAM 13 is used as a work memory in which various kinds of data are temporarily stored when the CPU 11 executes a process in accordance with a program.

The nonvolatile memory 14 is a memory (flash memory) in which stored contents are not damaged when the power supply is switched off, and is used for storing various kinds of setting information and the like.

The network communication unit 15 connects to the local network 3 or the private network 4, and communicates with the cloud server 7 or some other external device through a wired or wireless network.

The near-field communication unit 16 executes near-field communication with the multifunction peripheral 5. Note that the multifunction peripheral 5 also has a function of executing near-field communication.

The operation panel 17 includes an operation unit 18 and a display unit (display) 19. The display unit 19 functions to display various kinds of operation screens, setting screens, and the like. The display unit 19 is formed with a liquid crystal display and its driver. The operation unit 18 functions to receive various kinds of operations from the user. The operation unit 18 includes a keyboard or the like that receives inputs of characters, numbers, symbols, and the like, and a touch screen or the like provided on the display surface of the display unit 19. An operation screen based on the display data of the Web UI is displayed on the display unit 19, and an operation on the operation screen is accepted by the touch screen.

The CPU 11 of the information processing terminal 10 operates according to the program stored in the ROM 12, to function as an operation acceptor 21, a determiner 22, a synchronizer 23, a transmission control unit 24, a switcher 25, and the like.

The operation acceptor 21 functions to display an operation screen of an image processing apparatus (such as the multifunction peripheral 5) in accordance with Web UI display data received from the cloud server 7, return information about an operation received from the user through the operation screen to the cloud server 7, and accept a job setting operation. This function may be realized by a general-purpose browser.

In accordance with a predetermined determination condition, the determiner 22 determines whether to transmit job setting information created by the cloud server 7 from the cloud server 7 to the multifunction peripheral 5 by a first communication method involving a path via the local network 3 to which the multifunction peripheral 5 belongs.

Here, information about the security level of communication according to the first communication method for executing communication between the cloud server 7 and the multifunction peripheral 5 via the local network 3 is acquired, and a check is made to determine whether the security level meets a predetermined standard. In this manner, the determiner 22 determines whether to transmit the job setting information from the cloud server 7 to the multifunction peripheral 5 by the first communication method. The information about the security level of the local network 3 and the information about the security setting in the multifunction peripheral 5 are registered beforehand in the cloud server 7, and the determiner 22 of the information processing terminal 10 acquires these pieces of information from the cloud server 7 prior to the determination. The information about the security setting in the multifunction peripheral 5 may be acquired from the multifunction peripheral 5.

The synchronizer 23 functions to acquire the job setting information created by the cloud server 7 in accordance with the information about the operation, from the cloud server 7. For example, a transmission destination change request for transmission of the job setting information to the information processing terminal 10, instead of to the multifunction peripheral 5, is transmitted to the cloud server 7, and the job setting information transmitted from the cloud server 7 in response to this request is received.

The transmission control unit 24 transmits the job setting information acquired by the synchronizer 23 to the multifunction peripheral 5 by a second communication method (near-field communication in this example) that is different from the first communication method involving a path via the local network 3 to which the multifunction peripheral 5 belongs.

In a case where the security level of the local network 3 to which the terminal is connected meets the predetermined standard, the switcher 25 communicates with the cloud server 7 via the local network 3. In a case where the security level of the local network 3 does not meet the predetermined standard, the switcher 25 functions to switch connections so as to communicate with the cloud server 7 through the private network 4, not through the local network 3.

Figure 5:
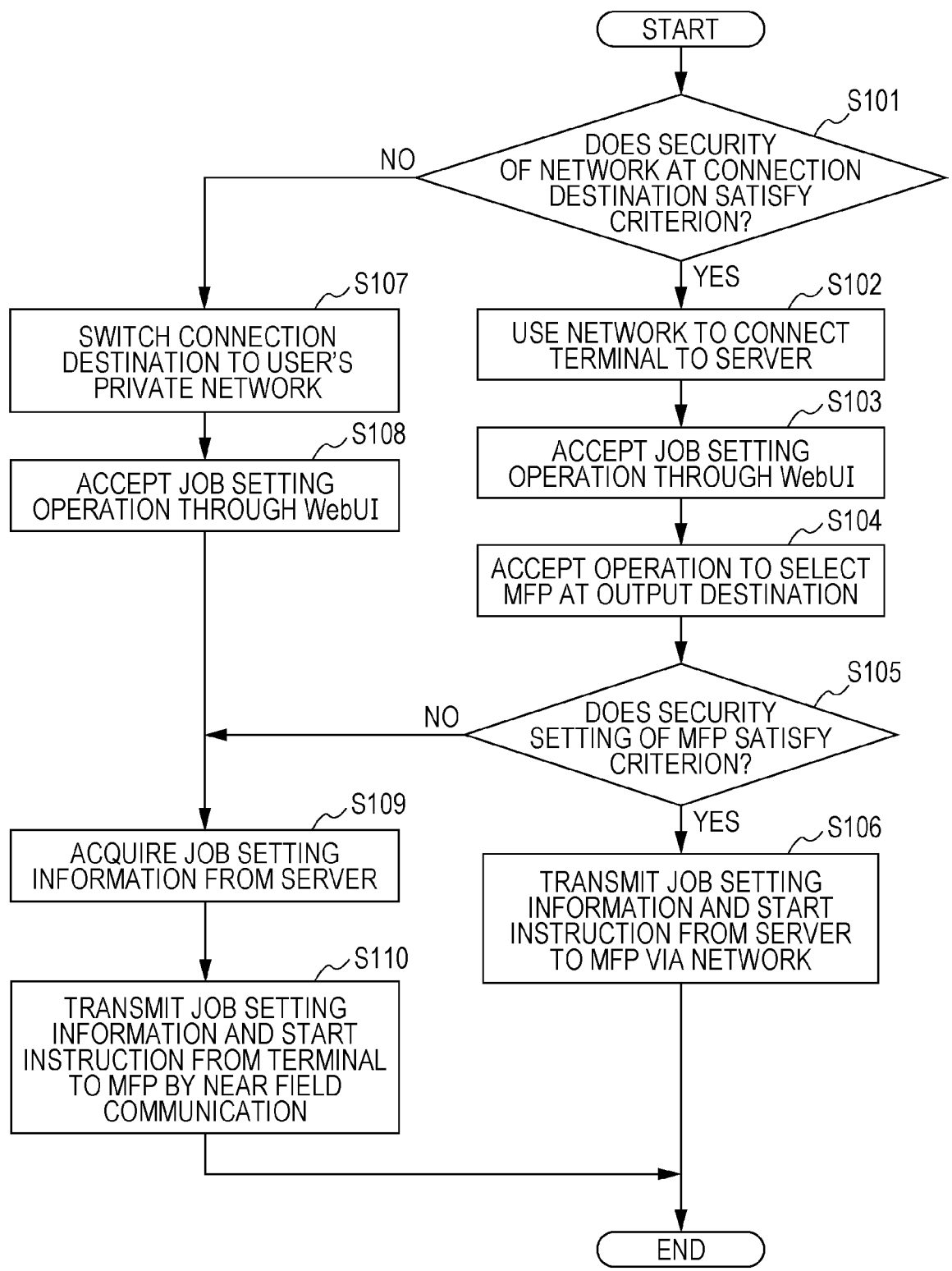
FIG. 5 is a flowchart showing a process to be executed by the information processing terminal with respect to the Web UI according to one or more embodiments.

FIG. 5 is a flowchart showing a process to be executed by the information processing terminal 10 with respect to the Web UI. Note that the information processing terminal 10 is connected to the local network 3 of the business client prior to a start of the process shown in FIG. 5.

The information processing terminal 10 determines whether the security level of the local network at the connection destination meets a predetermined standard (step S101). If the security level meets the predetermined standard (step S101: Yes), the currently connected local network is used for the connection between the information processing terminal 10 and the cloud server 7 (step S102).

The display data of an operation screen by the Web UI transmitted from the cloud server 7 is received and displayed, and a job setting operation is received from the user (step S103).

A multifunction peripheral 5 is then selected as the output destination by the user (step S104). Specifically, a multifunction peripheral 5 as the output destination is selected from among the multifunction peripherals 5 connected to the connected network.

A check is then made to determine whether the security setting in the selected multifunction peripheral 5 meets a predetermined standard (step S105). If the security setting meets the predetermined standard (step S105: Yes), job setting information and a job start instruction are transmitted from the cloud server 7 to the multifunction peripheral 5 via the network (the first communication method involving a path via the connected local network 3), and the job is executed (step S106).

If the security setting in the selected multifunction peripheral 5 does not meet the standard (step S105: No), job setting information is received from the cloud server 7 (step S109). For example, a transmission destination change request for transmission of the job setting information to the information processing terminal 10, instead of transmission of the job setting information to the multifunction peripheral 5, is transmitted to the cloud server 7, and the job setting information transmitted from the cloud server 7 in response to this request is received. The job setting information and a job start instruction are then transmitted from the information processing terminal 10 to the multifunction peripheral 5 by the second communication method that does not involve any path via the connected local network 3, such as near-field communication, and the job is executed (step S110).

If the information processing terminal 10 in step S101 determines that the security level of the local network at the connection destination does not meet the predetermined standard (step S101: No), the information processing terminal 10 switches its connection destination to the private network of the user (step S107). The display data of an operation screen by the Web UI transmitted from the cloud server 7 is then displayed, and a job setting operation is received from the user (step S108). The above mentioned transmission destination change request is then transmitted to the cloud server 7, and the job setting information is received from the cloud server 7 (step S109). The job setting information and a job start instruction are transmitted from the information processing terminal 10 to an appropriate multifunction peripheral 5 by the second communication method such as near-field communication, and the job is executed (step S110).

Figure 6:
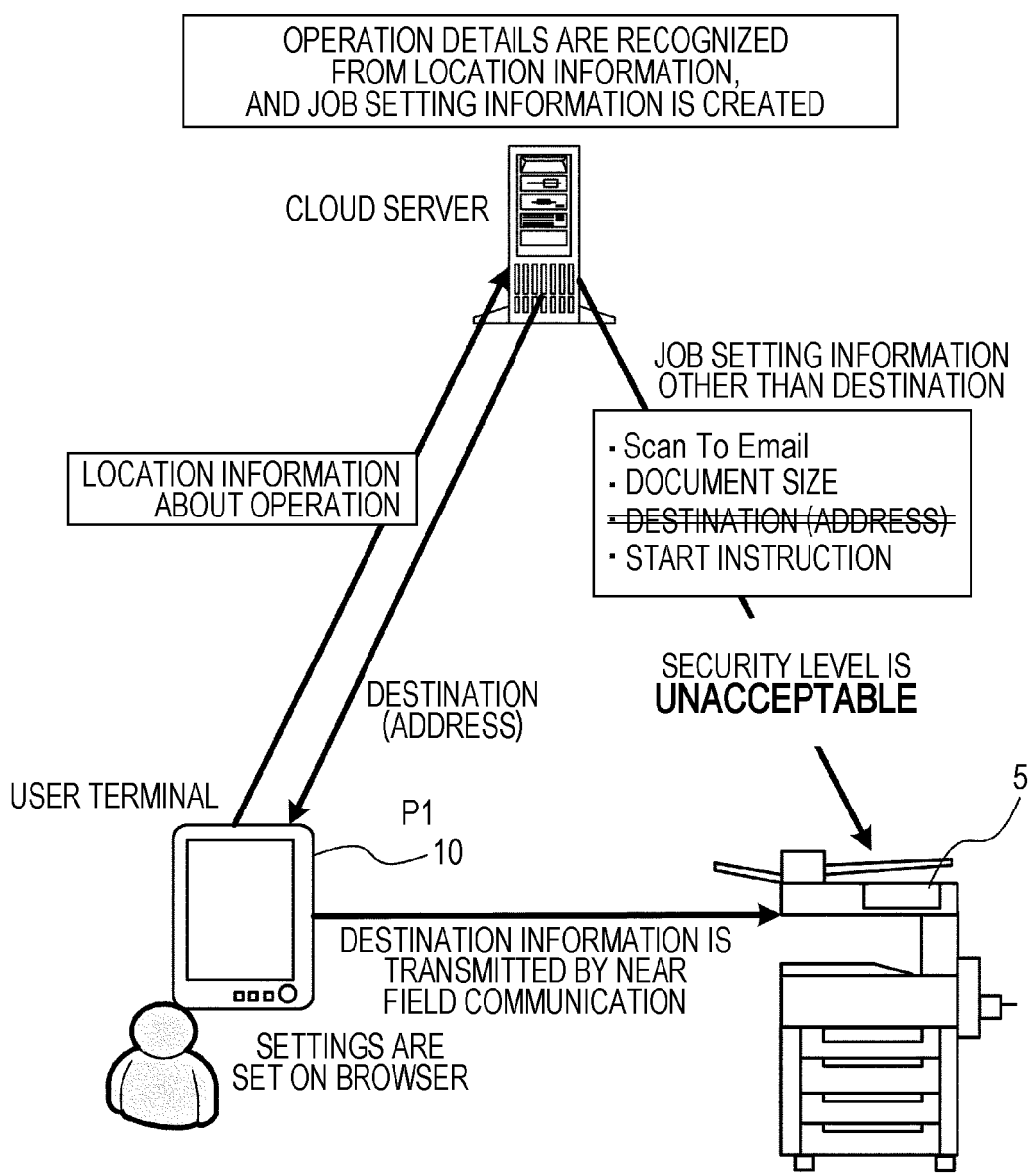
FIG. 6 is a diagram showing a data flow according to one or more embodiments.
Figure 7:
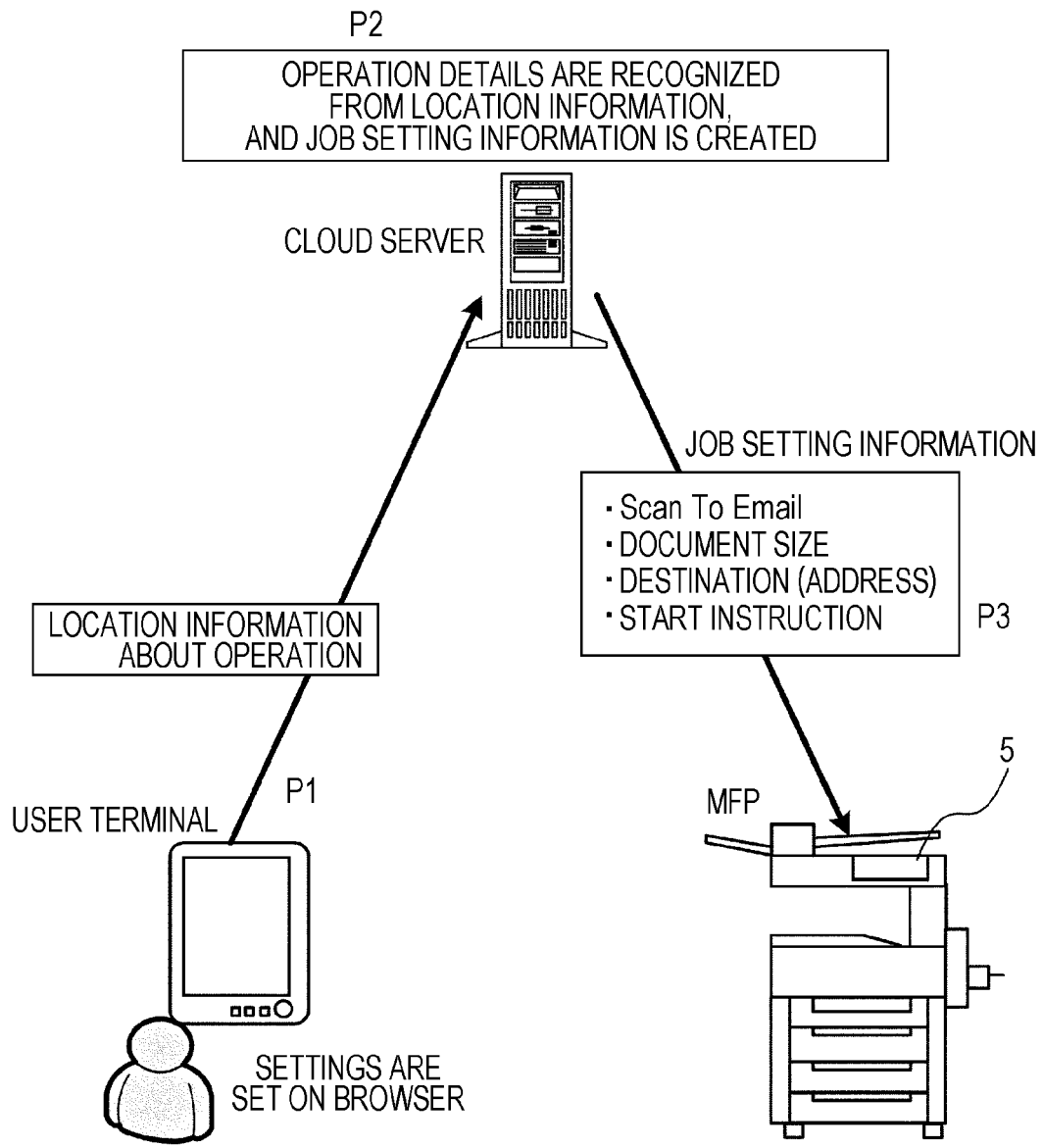
FIG. 7 is a diagram showing an example of data to be transmitted and received when a job is set/input with a Web UI by a conventional method.
Figure 8:
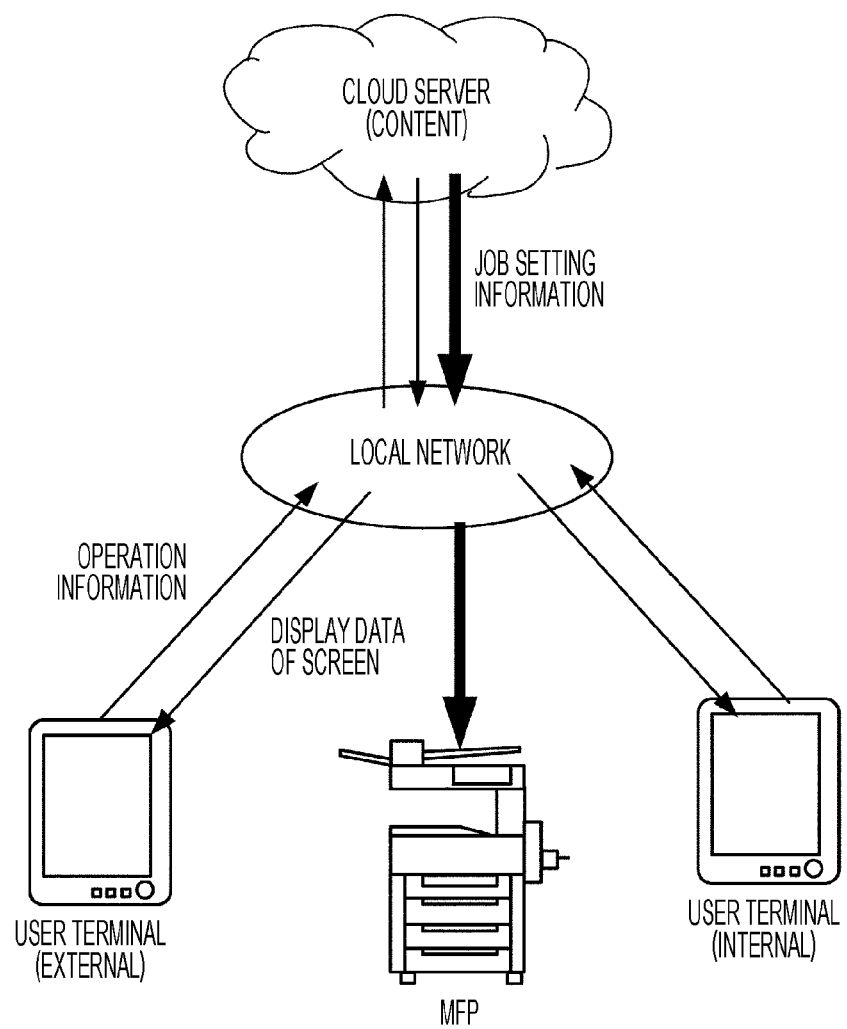
FIG. 8 is a diagram showing an example of a conventional connection state in a case where an information processing terminal is connected to the local network of a business client at the business client's office, and a Web UI function is used in setting/inputting a job.

In one or more embodiments, in a case where the security level of the local network 3 or the security setting in a multifunction peripheral 5 does not satisfy a predetermined standard, part of the job setting information is transmitted to the multifunction peripheral 5 by the second communication method such as near-field communication, and the remaining job setting information is transmitted to the multifunction peripheral 5 via the first communication method involving a path via the local network 3. For example, as shown in FIG. 6, in a ScanToEmail job, the destination information in the job setting information is high in confidentiality, and therefore, the second communication method (such as a method of transmitting information from the cloud server 7 to the multifunction peripheral 5 via the information processing terminal 10 by near-field communication or the like) is used in transmitting the destination information to the multifunction peripheral 5. The other information in the job setting information is low in confidentiality, and therefore, the first communication method (a method of transmitting information from the cloud server 7 to the multifunction peripheral 5 via the local network 3) is used in transmitting the remaining job setting information to the multifunction peripheral 5.

Further, the communication method to be used may be switched between the second communication method and the first communication method, depending on the job type (such as the degree of confidentiality, and inclusion/exclusion of the destination and personal information). In other words, the "predetermined standard" to be used in determining whether the security level or the security setting level of the multifunction peripheral meets the "predetermined standard" is changed depending on the job type. For example, in the ScanToEmail job, the predetermined standard is set at a higher standard than that in a copy job and the like.

As described above, according to one or more embodiments of the present invention, even in a case where the security level of the local network that belongs to a business client or the like and is used by the user at the business client's office or the like, or the security setting in an image processing apparatus such as a multifunction peripheral does not meet a standard in using a Web UI, job setting information is transmitted to the multifunction peripheral by the second communication method that does not use the local network of the business client, such as a private network or near-field communication. Thus, the multifunction peripheral can be made to execute the job while a high security level is maintained.

The image processing apparatus to which job setting information is transmitted is not necessarily a multifunction peripheral. The image processing apparatus may be simply a printer, a scanner, a facsimile machine, or the like, or may be some other image processing apparatus.

In the above embodiments, the communication method to be used is switched between the first communication method and the second communication method, depending on security levels. However, in a case where the information processing terminal connects to the local network at a business client's office or the like, the second communication method may be used all the time, for example.

In the above embodiments, the communication method to be used is switched between the first communication method and the second communication method, depending on security levels. However, even in a case where the local network 3 at a business client's office cannot be used for some reason, the connection destination may be switched to a private network, and job setting information may be transmitted to a multifunction peripheral 5 by near-field communication.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:
1. An information processing terminal comprising:
an operation panel; and
a hardware processor that:

causes the operation panel to display an operation screen of an image processing apparatus in accordance with Web User Interface (UI) display data received from a server, returns, to the server, information on a user operation received through the operation screen, and receives a job setting operation of the user operation;

determines, when a predetermined determination condition is met, whether job setting information created by the server is transmitted from the server to the image processing apparatus by a first communication method, wherein the server recognizes details of the user operation from the information on the user operation, and the first communication method involves a path via a local network to which the image processing apparatus belongs;

acquires the job setting information from the server when determining that the first communication method is not used; and transmits the acquired job setting information to the image processing apparatus using a second communication method different from the first communication method.

2. The information processing terminal according to claim 1, wherein
the hardware processor acquires a security level of communication by the first communication method, and
the predetermined determination condition is that the security level meets a predetermined standard.

3. The information processing terminal according to claim 2, wherein the hardware processor communicates with the server by connecting to the local network when the security level of the local network meets the predetermined standard, and switches the connection to communicate with the server through a private network without using the local network when the security level of the local network does not meet the predetermined standard.

4. The information processing terminal according to claim 2, wherein the hardware processor changes the predetermined standard in accordance with a job.

5. The information processing terminal according to claim 2, wherein,
upon determining that the job setting information is not transmitted from the server to the image processing apparatus by the first communication method, the hardware processor receives part of the job setting information from the server, and transmits the part of the job setting information to the image processing apparatus by the second communication method, and
a remaining part of the job setting information is transmitted from the server to the image processing apparatus using the first communication method.

6. The information processing terminal according to claim 1, wherein the second communication method is near-field communication.

7. A non-transitory recording medium storing a computer readable program implemented in an information processing terminal that comprises: an operation panel; and a hardware processor that causes the operation panel to display an operation screen of an image processing apparatus in accordance with Web User Interface (UI) display data received from a server, returns, to the server, information on a user operation received through the operation screen, and receives a job setting operation of the user operation, the computer readable program causing the hardware processor to execute:

determining, when a predetermined determination condition is met, whether job setting information created by the server is transmitted from the server to the image processing apparatus by a first communication method, wherein the server recognizes details of the user operation from the information on the user operation, and the first communication method involves a path via a local network to which the image processing apparatus belongs;

acquiring the job setting information from the server when determining that the first communication method is not used; and transmitting the acquired job setting information to the image processing apparatus using a second communication method different from the first communication method.

8. The non-transitory recording medium storing the computer readable program according to claim 7, wherein the computer readable program further causes the hardware processor to acquire a security level of communication by the first communication method, and
the predetermined determination condition is that the security level meets a predetermined standard.

9. The non-transitory recording medium storing the computer readable program according to claim 8, wherein the computer readable program further causes the hardware processor to communicate with the server by connecting to the local network when the security level of the local network meets the predetermined standard, and switch the connection to communicate with the server through a private network without using the local network when the security level of the local network does not meet the predetermined standard.

10. The non-transitory recording medium storing the computer readable program according to claim 8, wherein the computer readable program further causes the hardware processor to change the predetermined standard in accordance with a job.

11. The non-transitory recording medium storing the computer readable program according to claim 8, wherein,
upon determining that the job setting information is not transmitted from the server to the image processing apparatus by the first communication method, the hardware processor receives a part of the job setting information is received from the server, and transmits the part of the job setting information is transmitted by the second communication method, and
a remaining part of the job setting information is transmitted from the server to the image processing apparatus using the first communication method.

12. The non-transitory recording medium storing the computer readable program according to claim 7, wherein the second communication method is near-field communication.

* * * * *